March 18, 1952 R. CALVERT 2,589,535

HIGH-FREQUENCY ALTERNATING CURRENT BRIDGE

Filed Feb. 13, 1950 2 SHEETS—SHEET 1

INVENTOR
RAYMOND CALVERT
By Wilkinson & Mawhinney
Attorneys

HIGH-FREQUENCY ALTERNATING CURRENT BRIDGE

Filed Feb. 13, 1950

2 SHEETS—SHEET 2

INVENTOR
RAYMOND CALVERT
BY Wilkinson & Mawhinney
Attorneys

Patented Mar. 18, 1952

2,589,535

UNITED STATES PATENT OFFICE 2,589,535

HIGH-FREQUENCY ALTERNATING CURRENT BRIDGE

Raymond Calvert, New Malden, England, assignor to The Wayne Kerr Laboratories Limited, New Malden, England, a British company Application February 13, 1950, Serial No. 143,976
In Great Britain February 26, 1948

9 Claims. (Cl. 323—75)

This invention relates to high frequency alternating current bridges and is particularly applicable to bridges in which transformer windings with a known turns ratio are used as the ratio arms.

In alternating current bridges for use at very high frequencies, serious errors of measurement can be caused by inductive loops which are sometimes formed by the interconnecting leads between components. In the past it has been the practice to reduce these inductive loops to a minimum by making most of the connections with wide, thin copper tape; the tape carrying the "go" current to a particular component being laid face to face with a corresponding tape carrying the "return" current and separated from it by a thin layer of low-loss insulating material, so as to form a transmission line of suitable characteristics. This method, however, suffers from several grave disadvantages as a result of its lack of mechanical strength and rigidity. One is that it leads to extreme difficulties in manufacture, and another that it tends to restrict the frequency range of the bridge, owing to a failure to meet the very close tolerances required in the spacing between tapes.

It is an object of the present invention, therefore, to provide a new form of bridge construction which is robust, simple to manufacture and which dispenses with interconnecting leads.

It is a further object of the invention to provide a construction of bridge using transformer windings as ratio arms in which the shunt capacity across the transformer windings is considerably less than has heretofore been possible.

It is yet a further object of the invention to provide a bridge construction having a screen between the impedance which is to be measured and the standard impedances.

According to this invention, all the components of a bridge are built around a central assembly of rigid conducting plates or blocks which not only provide all the required electrical connections but also act as mountings for the standard impedances and the terminals for connecting the unknown impedance. By suitably choosing the areas of adjacent surfaces of these plates or blocks and by adjusting the spacing between them, it is possible to obtain an optimum ratio of series inductance to shunt capacity in the assembly for whatever frequency range the bridge is required to cover.

Further features of the invention will be apparent from the following description of one embodiment thereof, reference being made to the accompanying drawings in which.

Figure 1:
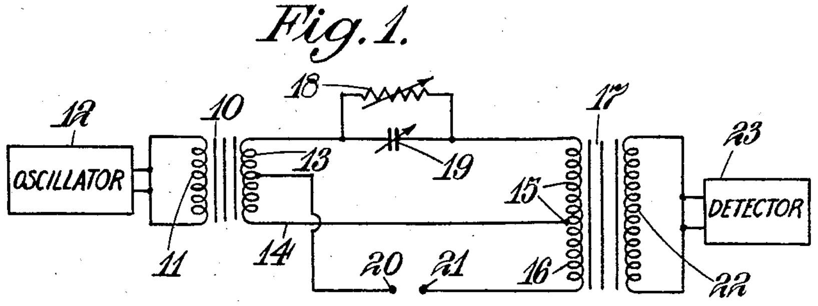
Figure 1 is a circuit diagram of a high frequency bridge of a type to which the present invention can be applied.

Before describing the mounting assembly in detail it is necessary to refer to the electrical principles of the type of high frequency bridge to which the present invention applies. A simplified circuit diagram of such a bridge is shown in Figure 1 and comprises a transformer 10 having a primary winding 11 energised by a high frequency oscillator 12 and tapped secondary winding 13, one end 14 of which is connected to a tapping point 15 on the primary winding 16 of second transformer 17. The standard impedance comprises an adjustable resistor 18 in shunt across an adjustable condenser 19 and this impedance is connected between one end of the winding 13 and one end of the winding 16. Terminals 20, 21 are provided for connecting the ends of the impedance to be measured respectively to a tap on the winding 13 and one end of the winding 16. The transformer 17 is provided with a secondary winding 22 connected to a detector 23. The ratio arms of the bridge are formed by the two halves of the tapped winding 16 and balance is obtained by adjusting the standard resistor 18 and condenser 19 until the core fluxes set up in the two halves of the winding 16 cancel. All the currents which flow through the ratio arms of winding 16 return to the secondary winding of transformer 10 through the connection between points 14 and 15, which will be referred to as the neutral connection. It will be appreciated that there are many known bridge circuits and the arrangement shown in Figure 1 is merely an example of a bridge circuit used in order to explain more clearly the features of the present invention.

In Figures 2 to 5 there is illustrated a typical form of mounting assembly constructed according to the present invention and designed to carry the components indicated in Figure 1 and to make all the required circuit connections. The neutral connection is formed by a rigid metal plate 25 around which the whole bridge is built. This plate is firmly fixed in an outer screening box by means of insulating supports 26. The terminals 20, 21 for the connection of the unknown impedance are mounted respectively on metal blocks 31, 32 which are formed integrally with the rigid metal plates 33, 34 which are in turn bolted to the plate 25 through insulating bushes. On the opposite side of the neutral plate 25 are disposed a further pair of rigid metal plates 35, 36 which also are firmly secured to the neutral plate by bolts passing through insulating bushes 37. The blocks 31, 32 have parallel adjacent surfaces which are spaced apart by an insulating shim 38. Similarly each of the plates 33, 34, 35 and 36 have surfaces parallel to and adjacent a surface of the neutral plate 25 but are spaced therefrom by the insulating shims 39.

Figure 3:
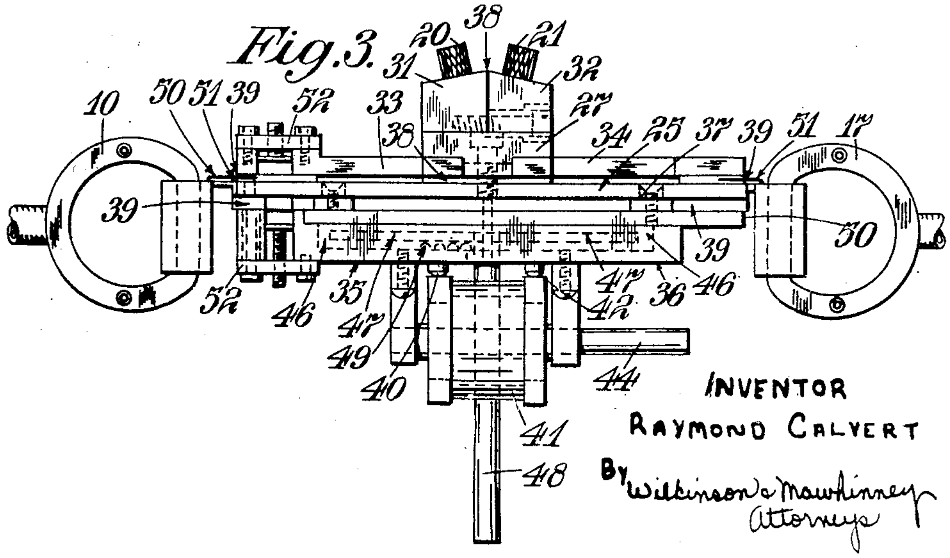
Figure 3 is an end elevation of the assembly.
Figure 4:
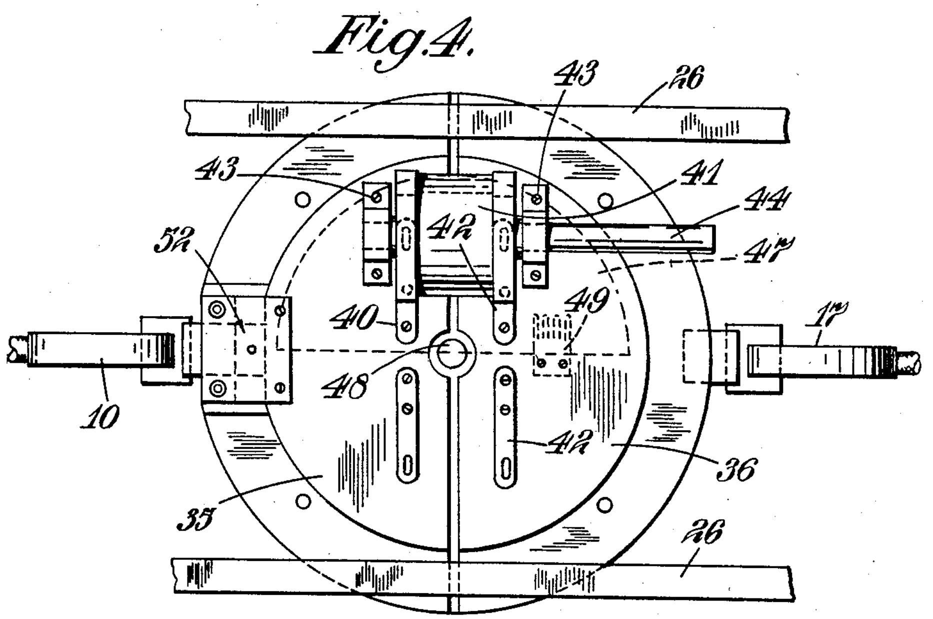
Figure 4 is a view of the bottom of the mounting assembly with one of the resistance drums removed.

The standard impedances, comprising a variable air condenser, resistor drums and trimming elements are fixed to the two plates 35, 36, in such a manner as to connect across the gap. Thus one set of contacts 40 for the resistor drum 41 are on plate 35 and the other set of contacts 42 are on the plate 36. The resistor drum 42 is rotatably mounted in supports 43 secured to the plates 35, 36 and carries a number of carbon resistors which lie parallel to the drum axis and are disposed around the periphery of the drum so that by rotation of the spindle 44, any one of the resistors may be made to bridge the contacts 40, 42. Two such drums may be provided each, for example, having ten resistors but in order to show the contacts 40, 42, one of these drums has been removed in Figure 4. A variable air condenser may be mounted on the plates 35 and 36 with, for example, the fixed vanes attached to plate 35 and the movable vanes attached to plate 36. It is preferred, however, to make the standard condenser an integral part of the plates 35 and 36, as shown in Figures 3 and 4, thereby obtaining a considerable reduction in the physical dimensions of the assembly and making possible an extension of the frequency range employed. Referring to Figures 3 and 4, a semi-circular slot 46 is milled into each of the plates 35 and 36 to accommodate a semi-circular vane 47 mounted on a spindle 48. The vane 45 is electrically connected to the plate 35 by means of the contact fingers 49 but is free to turn without electrical contact into the slot on the plate 36. With this construction of condenser, the rest of the standards and the trimming components can then be mounted directly on the plate assembly comprising the condenser.

By providing the condenser with two or more movable vanes, it will be appreciated that the actual surface area of the vanes may be made smaller than in a single vane arrangement and such a construction is used in cases where it is desired to keep the overall width of the assembly between the transformers 10 and 17 to a minimum.

Figure 2:
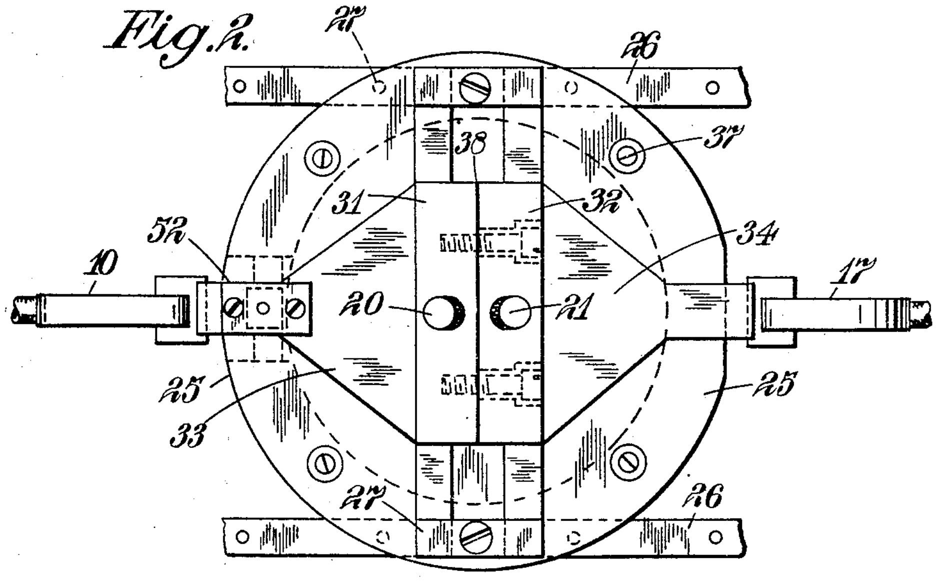
Figure 2 is a plan view of the mounting assembly.

The transformers are preferably of the kind described in my copending application Serial No. 143,975, filed February 13, 1950, and entitled "High Frequency Alternating Current Transformers" and are connected to the bridge assembly by the tapes 50 shown in Figures 2 and 3. These tapes, which are separated by insulating strips 51, are in the ends of the bridge windings of the transformer and are clamped between the plates of the mounting assembly, the insulating strips being arranged so that each tape makes contact with only one plate of the mounting assembly.

It will be noted that this construction is extremely robust and simple to manufacture. It permits a considerable reduction in the shunt capacity across the transformer windings since thin insulating shims are all that is necessary to maintain the separation of the plates. The greater part of the volume between the neutral plate 25 and the other plates can have air as the dielectric. The spacing between the neutral plate and the other plates can be simply adjusted by changing the thickness of the insulating shims. The plates can readily be shaped to conform to the optimum contour for current flow.

It will further be noted that owing to the rigidity of the plates and clamping arrangement for the transformer tapes, the transformers are easily changed. As the standards are fixed directly to the plates, a vary compact configuration can be obtained, which greatly increases the upper frequency of measurement. It will still further be noted that with this construction, the neutral plate 25 acts as screen between the unknown impedance and the standard impedances.

Figure 5:
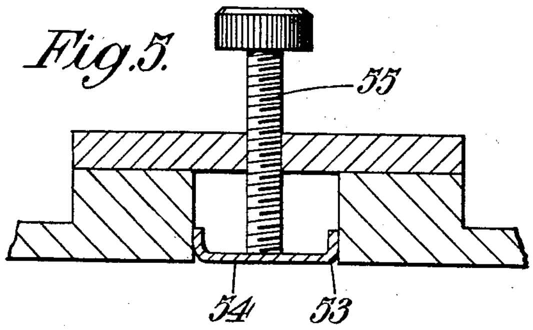
Figure 5 is an enlarged sectional view of a trimming inductance used in the assembly.

Yet another advantage of this method of construction utilising conducting plates is the simple manner in which small trimming inductances can be introduced without the necessity of connecting leads. In a very high frequency bridge, even when everything has been done to reduce the values of series inductances, it is often necessary to introduce such trimming in order to bring the residuals on the two sides of the bridge into the correct ratio. Figure 5 is a cross-section of one of the trimming inductances 52 of Figures 3–5. This trimmer comprises a slot 53 cut in one of the plates and a U-shaped conducting member 54 bridging the slot. The U-shaped member is mounted on an adjusting screw 55 carried in an insulating support 56 and so forms an adjustable plunger which can be used to vary the self inductance of the slotted plate.

I claim:

1. A mounting assembly for carrying standard and unknown impedances in a high frequency bridge comprising a number of rigid conducting members to form electrical connectors between said impedances which conducting members have adjacent surfaces and are secured in fixed spatial relationship, and spacing members of insulating material between the adjacent surfaces of the conducting members, the areas of the surfaces and the spacing between them being arranged to provide the desired ratio of series inductance to shunt capacity of the conducting members.

2. A mounting assembly for carrying impedances in a high frequency bridge comprising in combination a number of rigid conducting members to form electrical connectors between said impedances which conducting members have adjacent surfaces and are secured in fixed spatial relationship, spacing members of insulating material between the adjacent surfaces of the conducting members, means for mounting at least one standard impedance on a pair of said conducting members and means for connecting an impedance to be measured between a second pair of said conducting members.

3. A mounting assembly to carry standard and unknown impedances in a high frequency bridge comprising a rigid conducting plate, a first pair of conducting members disposed on one side of the conducting plate and having a pair of adjacent surfaces, each of said first pair of conducting members also having a surface adjacent the conducting plate, a second pair of conducting members disposed on the opposite side of the conducting plate to said first pair, which second pair of conducting members have a pair of adjacent surfaces and also each have a surface adjacent the conducting plate, spacing members disposed between said adjacent surfaces, means for connecting at least one standard impedance directly between the two members of said first pair and means for connecting an impedance to be measured between the two members of said second pair.

4. A high frequency bridge for comparing standard and unknown impedances comprising a first transformer having a primary winding for connection to a high frequency alternating supply source and a tapped secondary winding; a rigid conducting plate connected to the secondary winding of said first transformer; a first pair of conducting members disposed on one side of the conducting plate and having a pair of adjacent plates said first pair of conducting members also each having a surface adjacent to a surface of the conducting plate; means for connecting the two ends of the impedance to be measured respectively to the two conducting members of said first pair; a second pair of conducting members disposed on the opposite side of the conducting plate to said first pair, which second pair of conducting members have a pair of adjacent surfaces and also each have a surface adjacent to a surface of the conducting plate; spacing members disposed between said adjacent surfaces; at least one standard impedance mounted on said second pair of conducting members with its ends connected respectively to the two members of said second pair; a second transformer having a tapped primary winding and a secondary winding for connection to a detector; means connecting one conducting member of said first pair and one conducting member of said second pair respectively to points on the secondary winding of said first transformer spaced from the point of connection of said conducting plate to this winding; and means connecting the second member of said first pair, the second member of said second pair and said conducting plate respectively to separate points on the primary winding of said second transformer.

5. A high frequency bridge according to claim 4 wherein the means connecting said conducting plate and conducting members to the secondary winding of said first transformer comprises three parallel strip conductors spaced apart by insulating material.

6. A high frequency bridge according to claim 4 wherein the means connecting said conducting plate and conducting members to the primary winding of said second transformer comprises three parallel strip conductors spaced apart by insulating material.

7. A mounting assembly for a high frequency bridge comprising a first pair of conducting members having a pair of adjacent surfaces, means for connecting the ends of an impedance to be measured respectively to the two conducting members of said first pair, a second pair of conducting members having a pair of adjacent surfaces, at least one standard impedance mounted on said second pair and having its ends connected respectively to the two conducting members of said second pair, a screening plate disposed between said first pair and said second pair of conducting members, which screening plate is arranged to have a surface adjacent to at least one surface of each of said conducting members and insulating spacing members disposed between the adjacent surfaces of the screening plate and each of the conducting members and between the adjacent surfaces of the two members in each of said first and second pairs of conducting members, the spacing and area of the adjacent surfaces being arranged to provide the desired ratio of series inductance to shunt capacity of the conducting members.

8. A mounting assembly for a high frequency bridge comprising a number of rigid conducting members having adjacent surfaces, spacing members of insulating material between the adjacent surfaces of the conducting members, means for connecting the two ends of an impedance to be measured respectively to two adjacent members of a first pair of said conducting members, and a standard impedance mounted directly on a second pair of adjacent conducting members, said standard impedance having its ends connected respectively to the two members of said second pair and including at least a variable condenser comprising a movable vane disposed within adjacent slots formed in the two members of said second pair and means connecting the movable vane to one of the members of said second pair.

9. A mounting assembly for a high frequency bridge comprising a number of rigid conducting members having adjacent surfaces, spacing members of insulating material between the adjacent surfaces of the conducting members, means for connecting the two ends of an impedance to be measured to two adjacent members of a first pair of said conducting members, a standard impedance mounted directly on a second pair of adjacent conducting members, said standard impedance having its ends connected respectively to the two members of said second pair, a slot in at least one of said conducting members and a movable conducting plunger in said slot to adjust the inductance of the slotted conducting member.

RAYMOND CALVERT.

REFERENCES CITED

The following references are of record in the file of this patent:

UNITED STATES PATENTS

| Number | Name | Date |
|---|---|---|
| 1,518,543 | Nyquist | Dec. 9, 1924 |
| 2,309,490 | Young | Jan. 26, 1943 |
| 2,462,599 | Blumlein et al. | Feb. 22, 1949 |